(12) United States Patent
Khan et al.

(10) Patent No.: US 10,572,810 B2
(45) Date of Patent: Feb. 25, 2020

(54) MANAGING USER INTERACTION FOR INPUT UNDERSTANDING DETERMINATIONS

(71) Applicant: Microsoft Technology Licensing, LLC, Redmond, WA (US)

(72) Inventors: Omar Zia Khan, Bellevue, WA (US); Ruhi Sarikaya, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 687 days.

(21) Appl. No.: 14/591,603

(22) Filed: Jan. 7, 2015

(65) Prior Publication Data

US 2016/0196499 A1 Jul. 7, 2016

(51) Int. Cl.
*G06N 5/04* (2006.01)
*G06F 3/16* (2006.01)
(Continued)

(52) U.S. Cl.
CPC .............. *G06N 5/048* (2013.01); *G06F 3/167* (2013.01); *G10L 15/22* (2013.01);
(Continued)

(58) Field of Classification Search
CPC ....... G06N 5/048; G06F 3/0484; G06F 3/167; G10L 15/22; G10L 15/1822; G10L 2015/223; G10L 2015/228
See application file for complete search history.

(56) References Cited

U.S. PATENT DOCUMENTS 6,182,028 B1 1/2001 Karaali et al.
6,581,033 B1 6/2003 Reynar et al.
(Continued)

FOREIGN PATENT DOCUMENTS

CN 1959628 A 5/2007
CN 101038581 A 9/2007
(Continued)

OTHER PUBLICATIONS

PCT 2nd Written Opinion in International Application PCT/US2016/012247, dated Nov. 23, 2016, 8 pgs.
(Continued)

*Primary Examiner* — Eric Nilsson

(57) ABSTRACT

Examples of the present disclosure improve decision-making for input understanding to assist in determining how to best respond to a user input. A received input is analyzed using an input recognition component, input understanding component and input context component. Potential response options are determined. If uncertainty exists with respect to responding to the received input, an uncertainty value and a cost of misclassification are generated for the potential response options to assist in making a decision as to how to best respond to the received input. The uncertainty value is determined for a potential response and parameters associated with the potential response and the cost of misclassification is a cost associated with pursuing a potential response if the potential response turns out to be incorrect. A response is selected to transmit to a user based on analyzing the generated uncertainty value and the generated cost of misclassification for the potential responses.

20 Claims, 9 Drawing Sheets

(51) Int. Cl.
*G10L 15/22* (2006.01)
*G10L 15/18* (2013.01)

(52) U.S. Cl.
CPC .... *G10L 15/1822* (2013.01); *G10L 2015/223* (2013.01); *G10L 2015/228* (2013.01)

(56) References Cited

U.S. PATENT DOCUMENTS

| | | |
|---|---|---|
| 6,922,669 B2 | 7/2005 | Schalk et al. |
| 6,931,384 B1 | 8/2005 | Horvitz et al. |
| 7,149,970 B1 | 12/2006 | Pratley et al. |
| 7,216,080 B2 | 5/2007 | Tsiao et al. |
| 7,493,257 B2 | 2/2009 | Kim et al. |
| 7,577,709 B1 * | 8/2009 | Kolcz ................ G06K 9/6217 706/20 |
| 7,606,714 B2 | 10/2009 | Williams et al. |
| 7,684,990 B2 | 3/2010 | Caskey et al. |
| 7,716,056 B2 | 5/2010 | Weng et al. |
| 7,729,904 B2 | 6/2010 | Bennett |
| 7,869,998 B1 | 1/2011 | Di Fabbrizio et al. |
| 7,925,507 B2 | 4/2011 | Weng et al. |
| 7,974,842 B2 | 7/2011 | Helbing et al. |
| 8,249,876 B1 | 8/2012 | Ainslie |
| 8,346,563 B1 | 1/2013 | Hjelm et al. |
| 8,355,920 B2 | 1/2013 | Gopinath et al. |
| 8,566,076 B2 | 10/2013 | Deng et al. |
| 8,600,760 B2 | 12/2013 | Grost et al. |
| 8,677,377 B2 | 3/2014 | Cheyer et al. |
| 8,799,000 B2 | 8/2014 | Guzzoni et al. |
| 8,909,528 B2 | 12/2014 | Eide et al. |
| 8,954,420 B1 | 2/2015 | Khan et al. |
| 8,983,840 B2 | 3/2015 | Deshmukh et al. |
| 8,996,381 B2 | 3/2015 | Mozer et al. |
| 9,009,046 B1 | 4/2015 | Stewart |
| 9,043,197 B1 | 5/2015 | Pasca et al. |
| 9,152,376 B2 | 10/2015 | Johnston et al. |
| 9,311,298 B2 | 4/2016 | Sarikaya et al. |
| 9,318,108 B2 | 4/2016 | Gruber et al. |
| 9,548,050 B2 | 1/2017 | Gruber et al. |
| 9,576,578 B1 | 2/2017 | Skobeltsyn et al. |
| 9,690,851 B2 | 6/2017 | Nauze et al. |
| 9,886,950 B2 | 2/2018 | Karov et al. |
| 10,140,206 B2 | 11/2018 | Sapozhnikov |
| 2002/0077806 A1 | 6/2002 | Tarbouriech et al. |
| 2003/0187644 A1 | 10/2003 | Mohri et al. |
| 2003/0233230 A1 | 12/2003 | Ammicht et al. |
| 2005/0149498 A1 | 7/2005 | Lawrence et al. |
| 2006/0271364 A1 | 11/2006 | Mirkovic et al. |
| 2007/0038436 A1 | 2/2007 | Cristo et al. |
| 2008/0177541 A1 | 7/2008 | Satomura |
| 2010/0100380 A1 | 4/2010 | Tur |
| 2012/0089387 A1 | 4/2012 | Gamon et al. |
| 2012/0089392 A1 | 4/2012 | Larco et al. |
| 2012/0102050 A1 | 4/2012 | Button et al. |
| 2012/0173464 A1 | 7/2012 | Tur et al. |
| 2012/0265528 A1 | 10/2012 | Gruber et al. |
| 2012/0296638 A1 | 11/2012 | Patwa |
| 2013/0080171 A1 | 3/2013 | Mozer et al. |
| 2013/0275164 A1 * | 10/2013 | Gruber .................. G10L 17/22 705/5 |
| 2013/0332158 A1 | 12/2013 | Corfield et al. |
| 2014/0019116 A1 | 1/2014 | Lundberg et al. |
| 2014/0040274 A1 | 2/2014 | Aravamudan et al. |
| 2014/0040748 A1 | 2/2014 | Lemay et al. |
| 2014/0181096 A1 | 6/2014 | Zhuang et al. |
| 2014/0250378 A1 | 9/2014 | Stifelman et al. |
| 2014/0280092 A1 | 9/2014 | Marantz et al. |
| 2014/0379326 A1 | 12/2014 | Sarikaya et al. |
| 2015/0012271 A1 | 1/2015 | Peng et al. |
| 2015/0142420 A1 | 5/2015 | Sarikaya et al. |
| 2015/0340033 A1 | 11/2015 | Di Fabbrizio et al. |
| 2016/0378080 A1 | 12/2016 | Uppala et al. |
| 2017/0018271 A1 | 1/2017 | Khan et al. |
| 2017/0139816 A1 | 5/2017 | Sapozhnikov |
| 2017/0330560 A1 | 11/2017 | Wang et al. |
| 2018/0068657 A1 | 3/2018 | Khan et al. |
| 2018/0321052 A1 | 11/2018 | Gilbert |

FOREIGN PATENT DOCUMENTS

| | | |
|---|---|---|
| EP | 1199630 | 4/2002 |
| JP | 2003255986 | 9/2003 |
| WO | 200075864 | 12/2000 |
| WO | 2006084228 | 8/2006 |
| WO | 2008049834 A2 | 5/2008 |
| WO | 2011028842 | 3/2011 |
| WO | 2011088053 | 7/2011 |
| WO | 2012135783 | 10/2012 |

OTHER PUBLICATIONS

Kang, et al., "Hierarchical Speech-Act Classification for Discourse Analysis", In Journal of Pattern Recognition Letters, vol. 34, Issue 10, Jul. 2013, 21 pages.

Brezillon, Patrick, "Context-Based Intelligent Assistant Systems: A discussion based on the Analysis of Two Projects", In Proceedings of the 36th Annual Hawaii International Conference on System Sciences, Jan. 6, 2003, 9 pages.

Chen et al., "Machine Learning", Published on: Mar. 4, 2010, Available at: http://research.microsoft.com/en-us/groups/ml/, 3 pgs.

Crockett, et al., "A Fuzzy Model for Predicting Learning Styles using Behavioral Cues in an Conversational Intelligent Tutoring System", In IEEE International Conference on in Fuzzy Systems, Jul. 2013, 8 pages.

International Search Report in PCT/US2016/012247, dated Apr. 14, 2016, 13 pages.

Ammicht, et al., "Ambiguity Representation and Resolution in Spoken Dialogue Systems", In Proceedings of European Speech Processing Conference, Sep. 2001, 4 pages.

He, et al., "Speech-Centric Information Processing: An Optimization-Oriented Approach", In Proceedings of IEEE, vol. 101, Issue 5, May 2013, 20 pages.

Khan, Omar Zia, et al., "Hypotheses Ranking and State Tracking for a Multi-Domain Dialog System using Multiple ASR Alternates", Sep. 1, 2015, retrieved from Internet https://www.microsoft.com/en-us/research/wp-content/uploads/2015/09/1593anav.pdf, 5 pages.

PCT 2nd Written Opinion Issued in PCT Application No. PCT/US2016/041827, dated Jun. 13, 2017, 6 Pages.

PCT International Application PCT/US2016/012247, International Preliminary Report on Patentability dated Feb. 22, 2017, 9 pages.

PCT International Preliminary Report on Patentability Issued in PCT Patent Application PCT/US2016/041827, dated Sep. 29, 2017, 9 Pages.

PCT International Search Report and Written Opinion Issued in PCT Application No. PCT/US2017/048106, dated Nov. 24, 2017, 12 Pages.

PCT International Search Report in International Application PCT/US2016/041827, dated Sep. 30, 2016, 13 pages.

Robichaud, et al., "Hypotheses Ranking for Robust Domain Classification and Tracking in Dialogue Systems", Proc. Interspeech, Sep. 14, 2014, retrieved from Internet: http://mazsola.iit.uni-miskolc.hu/-czap/letoltes/IS14/IS2014/pdf/author/is141384.pdf, 5 pages.

Sun, Ming, "Adapting Spoken Dialog Systems towards Domains and Users", In Thesis of Language Technologies Institute, School of Computer Science, Carnegie Mellon University, Retrieved on: Jul. 13, 2016, 82 pages.

U.S. Appl. No. 14/797,492, Amendment and Response filed Apr. 27, 2017, 19 pages.

U.S. Appl. No. 14/797,492, Amendment and Response filed Sep. 20, 2017, 18 pages.

U.S. Appl. No. 14/797,492, Office Action dated Jan. 27, 2017, 14 pages.

U.S. Appl. No. 14/797,492, Office Action dated Oct. 5, 2017, 18 pages.

U.S. Appl. No. 14/797,492, Office Action dated Jul. 20, 2017, 17 pages.

(56) References Cited

OTHER PUBLICATIONS

U.S. Appl. No. 15/297,790, Office Acton dated Jan. 9, 2018, 19 pages.
"Summons to attend Oral Hearings Issued in European Patent Application No. 16701888.6", Mailed Date: Jan. 15, 2019, 45 pages.
"Final Office Action Issued in U.S. Appl. No. 14/797,492", dated May 16, 2018, 9 Pages.
"Office Action Issued in European Patent Application No. 16701888.6", dated May 22, 2018, 6 Pages.
"Final Office Action Issued in U.S. Appl. No. 15/297,790", dated Aug. 3, 2018, 21 Pages.
"Notice of Allowance Issued in U.S. Appl. No. 14/797,492", dated Oct. 4, 2018, 9 Pages.
U.S. Appl. No. 15/297,790, Office Acton dated Dec. 7, 2018, 22 pages.
"Notice of Allowance Issued in European Patent Application No. 16742518.0", dated May 20, 2019, 8 Pages.
"First office action and Search Report Issued in Chinese Patent Application No. 201680005172.5", dated Jun. 5, 2019, 15 Pages. (w/oEnglish Translation).

\* cited by examiner

FIG. 2
200

Action(s) Taken By Component of Input Understanding Platform:

| Input Processed by Input Recognition Component: 202 | Analyze Input by Input Understanding Component and Develop Alternative Understandings: 204 | Evaluate Context of Input by Input Context Component and Develop Possible Response Options: 206 | Further Evaluate Potential Response Options by User Interaction Mediation Component if Uncertainty Exists 208 | Determine Response To Send To User Including Modes of Clarification (if applicable) 210 |
|---|---|---|---|---|
| Example Determination (level of certainty): "Send Message to Omar" (100%) | Example Determination (level of certainty): "Send Text Message to Omar" (50%) <br><br> "Send Email Message to Omar" (50%) | Example Determination (level of certainty): "Draft Text Message to Omar" in Contacts' (20%) <br><br> "Send Text Message to Omar" in Contacts' (30%) <br><br> "Draft Email Message to Personal Email Address for Omar" in Contacts'(10%) <br><br> "Send Email Message to Personal Email Address for Omar" in Contacts' (15%) <br><br> "Draft Email Message to Business Email Address for Omar" in Contacts'(10%) <br><br> "Send Email Message to Business Email Address for Omar" in Contacts'(15%) | Example Determination (Aggregate uncertainty value/Cost of Misclassification): "Draft Text Message to Omar" in Contacts' (Low/Low) <br><br> "Send Text Message to "Omar" in Contacts'(High/High) <br><br> "Draft Email Message to Personal Email Address for "Omar" in Contacts'(Medium/Medium) <br><br> "Send Email Message to Personal Email Address for "Omar" in Contacts'(High/High) <br><br> "Draft Email Message to Business Email Address for "Omar" in Contacts'(Medium/Medium) <br><br> "Send Email Message to Business Email Address for "Omar" in Contacts'(High/High) | Example Responses: "Draft of Text Message to 'Omar in Contacts'" <br><br> "Request Clarification As to Whether to Send Text Message or Email Message" <br><br> "Draft Text Message to Omar and Request Clarification of Information to Include in Text Message (e.g. content)" |

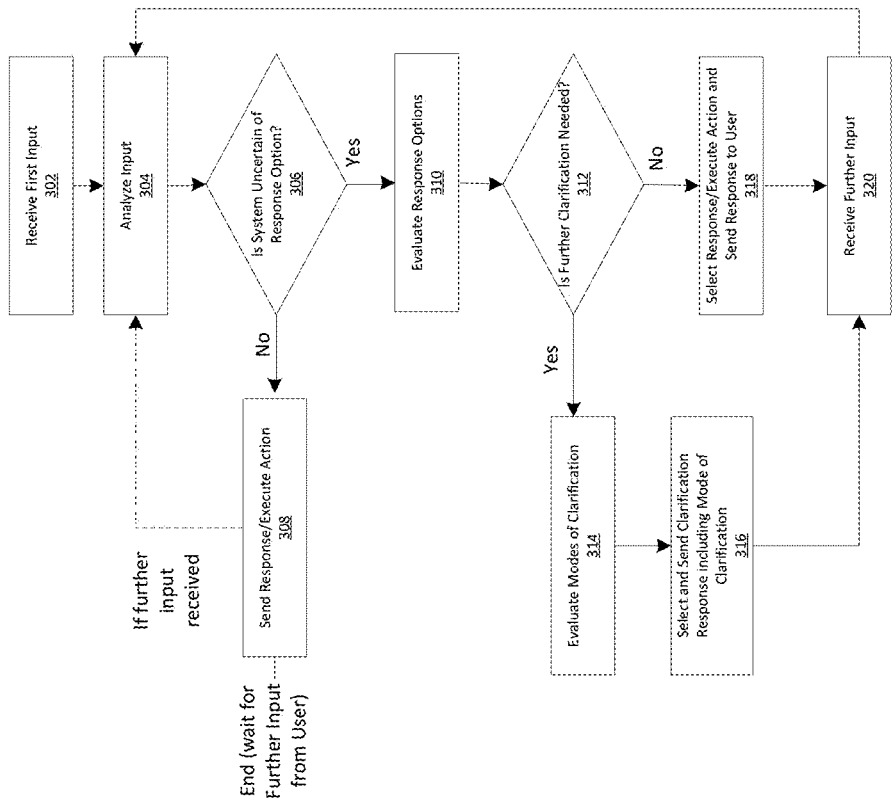

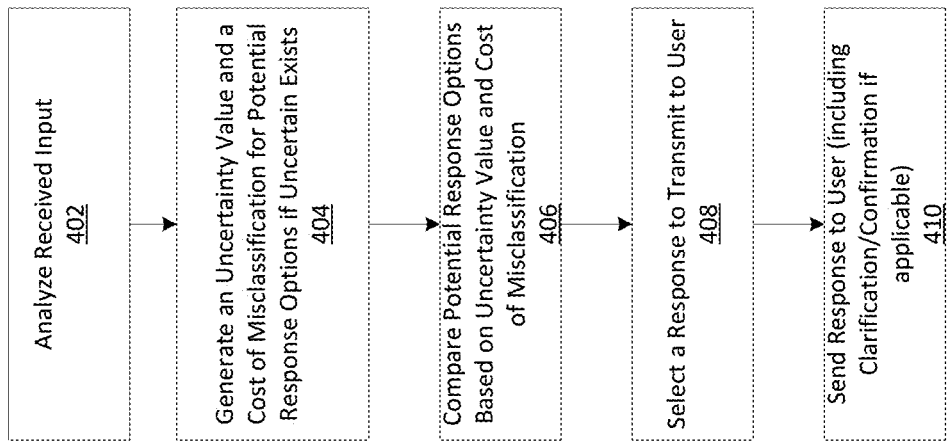

412

MANAGING USER INTERACTION FOR INPUT UNDERSTANDING DETERMINATIONS

BACKGROUND

Input understanding systems have to balance the trade-off between seeking clarifications from a user and taking action based on a best current belief of the system at a given point in time. Seeking confirmation or clarification for a query/command of a user enables a system to ensure that a user intention is accurately inferred. If a system repeatedly engages a user for confirmation or clarification, the system runs the risk of alienating the user. However, omitting confirmation/clarification steps may result in a decline of accuracy with respect to evaluation of a user intention as well as other usability issues. It is with respect to this general technical environment that the present disclosure is directed.

SUMMARY

Examples of the present disclosure improve decision-making for input understanding to assist in determining how to best respond to a user input. A received input is analyzed using an input recognition component, input understanding component and input context component. Potential response options are determined. If uncertainty exists with respect to responding to the received input, an uncertainty value and a cost of misclassification are generated for the potential response options to assist in making a decision as to how to best respond to the received input. The uncertainty value is determined for a potential response and parameters associated with the potential response and the cost of misclassification is a cost associated with pursuing a potential response if the potential response turns out to be incorrect. A response is selected to transmit to a user based on analyzing the generated uncertainty value and the generated cost of misclassification for the potential responses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an example method of input processing by an input understanding platform.

FIG. 3 illustrates an example method of input processing of multiple inputs.

FIG. 4A illustrates an example method of determining response to a received input.

DETAILED DESCRIPTION

The present disclosure describes examples that improve decision-making for an input understanding system to assist the input understanding system in determining how to best respond to a user input. Examples described herein balance a trade-off between executing an action based on a system or component's current belief with regard to user intent, and requesting clarification/confirmation from a user before executing an action. Input understanding systems such Conversational Understanding (CU) systems may face uncertainty when it comes to interpreting user input. Such systems are prone to errors from various sources (e.g., speech recognition errors, vagueness in user intention, topic shift in the conversation, inability of system to resolve entities referred to by the user etc.). In the face of such uncertainty, there are two choices available to the system: 1) the system can either execute an action with its best guess for a user intention thus risking that an incorrect action may be taken or, 2) the system can ask for clarification/confirmation/disambiguation to remove/reduce its uncertainty thus risking alienating the user due to delay in task completion and need for frequent repetitions. In the examples presented, various aspects related to user input determination may be evaluated to improve processing of an input understanding system. As examples, aspects related to an input understanding determination that may be evaluated include: 1) The cost of misclassification of intent, and 2) The confidence of an input understanding system at a given point in time. Evaluation of input determination aspects as described may improve accuracy in determining an appropriate response to a user input. For example, the system may be better informed to determine whether it is necessary to seek further clarification from a user or execute an action based on existing available information. This improves efficiency of task completion (e.g., reducing error rate as well as provides an enhanced user experience (e.g., enhancing reliability, improving usability, etc.) when processing user input.

Figure 1:
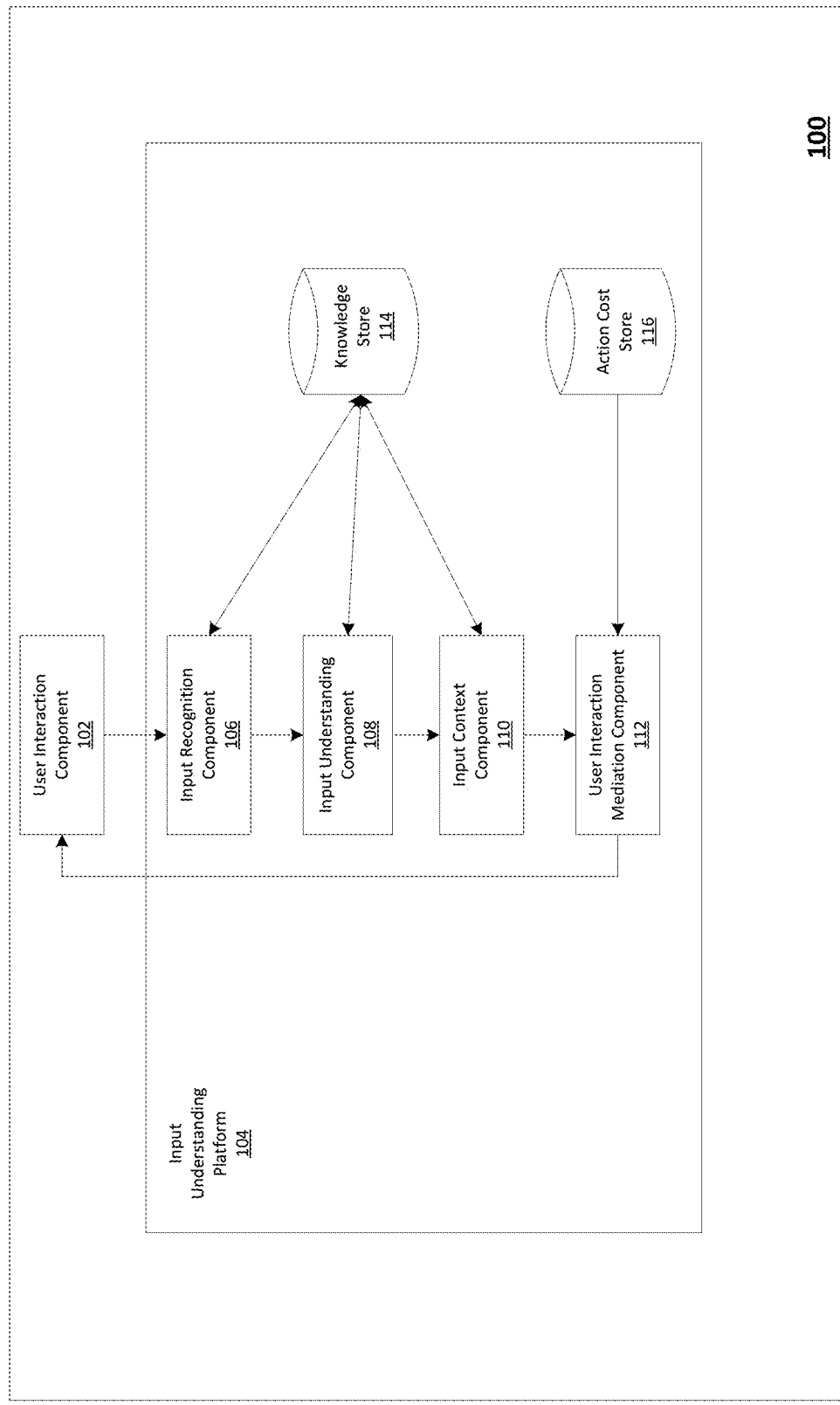
FIG. 1 illustrates an overview of an example system for input evaluation and response.

FIG. 1 illustrates an overview of an example system for input evaluation and response. The exemplary system 100 is a combination of interdependent components that interact to form an integrated whole for execution of input understanding and processing. Components of the system 100 may be hardware components or software implemented on hardware components of the system 100. Each component of the system 100 may comprise one or more system components. In some examples, the system 100 may be an application or service running software components on a device having a processor (e.g., processing device). For instance, an input understanding application or service may be run on a processing device such as a computer, mobile phone, tablet, gaming console, electronic devices, etc., where components of the system may be executed on the processing device. In other examples, components of the system 100 may be spread across multiple devices. For instance, input may be entered on a client device and information may be processed or accessed from other devices in a network such as a server device and/or data store. Please refer to FIGS. 5-7 for additional examples of hardware that may be included as part of the system 100. As one example, the system 100 may include components such as a user interaction component 102 and an input understanding platform 104 including components such as an input recognition component 106, an input understanding component 108, an input context component 110, a user interaction mediation component 112, a knowledge store 114 and an action cost store 116. However, the system 100 is not limited to such an example. The scale of systems such as system 100 may vary and include more or less components than those described in FIG. 1. Interfacing between the user interaction component 102 and other components of the system such as the input understanding platform 104 may occur through a network connecting components of the system 100 and resources external to the system 100. In one example, components of the system 100 may be connected through a distributed environment such as a cloud computing environment.

Components of the system 100 interface with an operating system (OS) of a processing device to allow input understanding and processing. For example, the system 100 may receive input from a user interaction component 102 (described below), and process a received input and return responses to the user via an input understanding platform 104 (described below). In one example, the system may be an input understanding system such as a conversational understanding (CU) system. However, the system 100 possesses processing means and may be configured to handle any type of input including but not limited to speech/voice input, text input, gesture input, handwritten input, among other examples. In one example, the system 100 may operate as an intelligent personal assistant. An intelligent personal assistant is a mobile software agent that can perform tasks, or services, for an individual based on user input, location awareness, and the ability to access information from a variety of online sources. Examples of intelligent personal assistants that the system 100 may operate with include but are not limited to SILVIA, S-Voice, Voice Mate, Google Now, Cortana, Hidi and Siri, among other examples.

The system 100 may receive input via a user input interaction component 102. The user interaction component 102 is a component that enables information/data in the form of an input to enter into the system 100 and allow the system 100 to communicate or interact with a user. As an example, the user interaction component 102 may enable a user to enter input to be analyzed and processed. As identified above, input can be in any form including speech/voice input, text input, gesture input and handwritten input, among other examples. The user interaction component 102 may interface with an OS of a processing device to provide a user interface for a user to enter input into the system 100. As an example, the user interaction component 102 may display a prompt upon request for input entry from a user. A user input prompt may be initiated by a user taking action (e.g., clicking on an icon, pressing a button, making a verbal request, gesturing, etc.). In alternative examples, a prompt for user input may be displayed on an OS for a user to enter input. The user interaction component 102 may interface with components of the OS. For example, control devices, display devices, headsets, mobile devices (e.g., WIFI, infrared or Bluetooth enabled), input panels (e.g., soft input panel, speech input panel), other electronic devices, etc., may be used in coordination with the user input component 102 to foster user interaction. The user interaction component 102 may also interface with other components of the system 100 such as the input understanding platform 104. The input understanding platform 104 is a collection of components used for processing a received input. The input understanding platform 104 is described in greater detail below. The user interaction component may pass received input to components of the input understanding platform 104 for processing and analysis. Responses may be passed from the input understanding platform 104 to the user interaction component 102 to be provided to a user. In some cases, the user interaction component 102 may be used to provide a user with information (e.g., updates, news, emergency messages, etc.) that may be pertinent to the user. This may occur without prompt from a user.

Processing components of the input understanding platform 104 may interface with components such as the knowledge store 114. The knowledge store 114 is a framework representing knowledge data or information used by components of the system 100 such as the input understanding platform 104. In one example, the knowledge store 114 may be a hardware component that has the ability to store data and process data to manage requests for knowledge data. In another example, the knowledge store 114 may be run as a software component executable on a processing device or across multiple processing devices, possibly even in communication with external or third-party services that contain any additional knowledge that can be of use. Knowledge data may be any data usable by a component of the system 100.

As an example, the input recognition component 106, the input understanding component 108 and the input context component, may use knowledge data to perform processing at each of component. Knowledge data increases the amount of information the system 100 has so that it may make more informed decisions at a given point in time. Types of information that the knowledge store 114 may maintain include but are not limited to information on: definitions, policy rules, name data, historical data (including data from previous queries), interrelationships between components of the system 100 (e.g., components of the input understanding platform 104), restrictions (e.g. formal stated descriptions of truth for evaluating data), classes (e.g., collections, concepts, programming types), attribute data (e.g., properties, features, characteristics, parameters), axioms, events and functional terms, among other examples. The knowledge store 114 may also communicate with components or resources outside of the system 100 to gather or collect information relevant to performing processing and making a best possible decision as to how the system 100 may respond to a user input. As an example, the knowledge store 114 may be linked to network resources over the Internet, for example search engines (e.g., Bing, Google Search, Yahoo Search, Ask, WebCrawler, Dogpile, etc.) as well as any other knowledge repositories (e.g., Wikipedia, Freebase, IMDB, Amazon, etc).

The input understanding platform 104 is a collection of components of the system 100 that are used for processing input, analyzing input, determining response options, and passing response options to the user interaction component 102 to provide to a user. In examples, the input understanding platform 104 may include any of hardware components (OS), software components (e.g., applications, application programming interfaces, virtual machines) running on hardware components, runtime libraries. In one example, the input understanding platform provides an environment for software components to run, obey constraints set for operating, and makes use of resources or facilities of the system 100. In at least one example, each component of the input understanding platform 104 may be software running on one or more processing devices. An exemplary input understanding platform 104 may include an input recognition component 106, an input understanding component 108, an input context component 110 and a user interaction mediation component 112. The input understanding platform 104 may also include components such as data storages/memory/ stores, for example a knowledge store 114 and action cost store 116 as shown in FIG. 1 and described below.

The input recognition component 106 is a component of the system 100 that receives processes and translates a received input for recognition. When an input is received via the user interaction component 102, the input is passed to the input recognition component 106 for processing. The input recognition component 106 may interface with the user interaction component 102 to provide a user with an interface to enter input and enable passing of the input from the user interaction component 102 to the input recognition component 106. As examples described above, inputs processed by the input recognition component 106 include but are not limited to: speech/voice input, text input, gesture input and handwritten input, among other examples. As an example, the input recognition component 106 may be able to process spoken queries into text. The input recognition component 106 may implement automatic speech recognition (ASR), computer speech recognition, or speech to text (STT), among other examples, to process speech to text for evaluation. Knowledge data from the knowledge store 114 may be used by the input recognition component 106 to improve recognition of a user input. As an example, the knowledge store 114 may maintain rules for input recognition processing, threshold data for determining whether an input is recognized, data on user characteristics (e.g., voice), patterns for user input, syntactical and grammatical data, among other examples, to assist the input recognition component 106 in recognizing a received input.

The system 100 may determine a confidence value for the received input when processed by the input recognition component 106. The input recognition component 106 may evaluate different aspects of the input to determine the confidence value for an input processed by the input recognition component 106. The confidence value indicates a certainty of the system 100 with respect to capturing the input. In an example where an input is received via spoken query or voice input, the input recognition component 106 may analyze aspects such as a specific voice of the user and fine-tune recognition based on vocal characteristics. However, any aspect of the input can be analyzed by the input recognition component 106 including syntax, grammar, movements/gestures, tone (of voice), length of input, etc. The confidence value may be used by the input understanding platform 104 in conjunction with confidence values for other components of the input understanding platform 104 (e.g., the input understanding component 108 and the input context component 110) to determine a level of certainty or uncertainty with respect to potential response options for the received input. The input recognition component 100 may be unable to capture an input from a user for any of a number of reasons including, input recognition errors, errors in input (e.g., spoken or text) provided by the user, lack of clarity (e.g., in spoken queries or commands), etc. If a low confidence value is associated with a received input, the system 100 may continue processing of the input via other components of the input understanding platform 104, but ultimately may ask for clarification from the user. In some cases where the input was not captured, the input recognition component 106 may request clarification from the user via the user interaction component 102.

Once an input is recognized, the input recognition component 106 passes the input to the input understanding component 108. The input understanding component 108 analyzes the input for understanding including determining understanding/alternative understandings of the analyzed input. Understandings of the received input are interpretations of the received input by the system 100 based on analysis of the received input by the system. As an example, the input understanding component 108 may be a natural language understanding (NLU) unit or a spoken language understanding (SLU) unit. Aspects of the input may be analyzed to determine understanding of the received input. Examples of aspects analyzed by the input understanding component 108 include but are not limited to: tagging of parts of the input, syntactic/semantic parsing of the input, proper name identification from the input, input classification, etc. Analysis of the received input may include application of knowledge data from the knowledge store 114. As an example, the knowledge store 114 may maintain rules for input understanding processing, semantic parsing of input, rules and methods for identifying portions of the input and slotting of data associated with the input, etc., to assist the input understanding component 108 in understanding a received input.

The system 100 may determine a confidence value for the input analyzed by the input understanding component 108. The input understanding component 108 may evaluate the different aspects of the input to determine a confidence value with respect to analyzing the input. A confidence value indicates a certainty of the system 100 with respect to understanding of the received input. A confidence value may be determined for each understanding of the received input identified by the input understanding component 108.

Understandings determined by the input understanding component 108 are passed to the input context component 110 for further evaluation. The input context component 110 evaluates context of the analyzed input including determining possible responses for the analyzed input and strategy for responding to a user. Evaluation of the context of understandings for a received input includes clarifying the meaning of the received input. The input context component 110 may interact with the knowledge store 114 to further analyze understandings determined by the input understanding component 108. As an example, the input context component 110 may apply knowledge data to an analyzed input to determine a state associated with an input so that the system 100 may make a determination as to how to proceed/ respond to a received input. For example, the input context component 110 may determine a context for the received input, and parameters associated with a context (e.g., what information may be needed to execute a task associated with a received input and what additional information needs to be requested based on its evaluation of the received input and understandings). For example, the system 100 may intelligently evaluate the flow/state of a conversation at the point of determining a context for the received input. The knowledge store 114 may maintain information useful to the input context component 110 in making informed decisions regarding contextual evaluation of a received input. Knowledge data may include but is not limited to: policy rules for interpreting user input and analyzed understandings, historical data with respect to present and past user interaction, usage patterns, word associations, access to components or resources external to the system 100, etc. Based on evaluation of the understandings of the received input, the input context component 110 determines possible response options and identifies parameters associated with the possible response options. A possible response option is an option that the system 100 may pursue in response to a receive input. Parameters associated with the possible response options are information that the system has obtained or needs clarification on from a user in order to accurately complete a request for a user. As an example, a received input may be "send an email to Andy". A possible response option to a received input may be to generate an email message to a contact named "Andy" from a list of contacts. If the system 100 is to execute an action to generate and send an email to a contact named "Andy", certain information may be needed to complete that email such as email address of Andy, content for the body of the email, etc. Other information may be optional but helpful to obtain from the user (if not already identified from analyzing and evaluating the received input) such as the subject of the email, who to copy on the email, etc. By evaluating the context of the understanding of the received input, the input context component 110 may generate an email message with an email address for "Andy". However, the subject, body and other fields of the drafted email may not yet be completed because the system 100 is uncertain about what information to include in such fields. Thus, response options and parameters for the response options are identified by evaluating the context of understandings generated by the system 100.

The system 100 may determine a confidence value for evaluating the context by the input context component 110. The input context component 110 may evaluate the different aspects of the input to determine a confidence value with respect to evaluating context. The confidence value indicates a certainty of the system 100 with respect to a response option and parameters associated with the response option. A confidence value may be determined for each response option identified by the input context component 110.

As an example, for voice/spoken input, an input context component 110 may be a dialog policy component that manages a state of a dialog and strategy of the system 100 in determining how to respond. In one example, a dialog policy component may comprise multiple components including a dialog manager and a dialog engine. A dialog manager is a component of an input context component 110 (e.g., dialog policy component) that is responsible for the state and flow of a conversation. The dialog engine may be used to perform processing to evaluate a context of a voice input. In some examples, the user interaction mediation component 112 may be a component of the input context component 110 (e.g., dialog policy component) and in other examples the user interaction mediation component 112 may be a component of the system 100 that is separate from an input context component 110. As an example, a dialog policy component (including the user mediation component 112) takes the different interpretations of the user's input from language understanding component along with confidences values and previous system responses. The dialog policy component may determine a cost associated with each possible system responses. In that example, the dialog policy component generates a system response based on the estimated cost.

The user interaction mediation component 112 is component that evaluates potential response options for a received input when the system is uncertain of information associated with the received input. If the system 100 is certain with respect to how to respond to a user input, processing of the user interaction mediation component may not be necessary. The user interaction mediation component 112 kicks in when system has some information but it is uncertain about the information. As identified above, confidence values are determined with respect to processing of the received input by components of the input understanding platform 104.

Confidence values may be any metric used to evaluate a confidence that a component of the system 100 is accurately interpreting understanding and evaluating a received input. The system 100 may evaluate a confidence value for a potential response option and parameters associated with the potential response option to determine whether further evaluation is required. In one example, a determination of certainty may relate to a threshold value of confidence that a potential response option is correct and that the system 100 has obtained enough information to take action based on a received input. In another example, the system 100 may determine to utilize the user interaction mediation component 112 when a certain type of uncertainty is identified. For example, if the system 100 indicates that the input recognition component 106 has a low confidence value in recognition of the received input, this may trigger use of the user interaction mediation component 112 to make a decision as to how to proceed. Examples of types of uncertainties that may trigger action by the user interaction mediation component 112 include but are not limited to: input is not recognized, questions over whether user intention is being interpreted correctly, competing response options (intents), system interprets that the user is inherently ambiguous regarding input, among other examples.

If uncertainty is identified, the user interaction mediation component 112 evaluates what is the best response option for the system 100 to respond to the received input. The user interaction mediation component 112 may determine whether an action should be executed in response to the received input or if the system 100 should request further clarification or confirmation of the received input before taking further action. As an example, if a received input is "send an email to Andy" actions taken by the system 100 may be to draft an email to Andy or send an email to Andy. If the system 100 is unsure whether to draft an email, send an email, or has other competing intents (e.g., send a text message to Andy) that appear appropriate, the system 100 may evaluate the possible response options further. For example, the user interaction mediation component 112 may manage data that may assist a system in determining a next response (e.g., whether to execute an action or request further clarification from user). A choice of executing an action or requesting clarification from a user may be based on two aspects: 1) the cost of misclassification of intent, and 2) The confidence of the system in a response option (including parameters of the response option) at a given point in time.

The cost of misclassification is a determination that speaks to how much the system 100 cares about uncertainty with respect to a potential response option and also how much the system 100 cares about uncertainty with respect to aspects (or parameters) of that potential response option. The cost of misclassification of intent may be a metric associated with a cost of pursuing a potential response option if the potential response turns out to be incorrect. In other words, if the system 100 gets a response option and/or aspects or parameters associated with the response option wrong, the cost of misclassification is a value estimating impact for the system 100 and user. Potential response options may be associated with different costs. For example, different actions (e.g. sending an email or setting a reminder) have different costs. Some costs may be higher than others. For instance, if the system 100 selects a response that is difficult to recover from (e.g., sending an email to a wrong recipient) that response option would be associated with a high cost of misclassification. Multiple aspects of a potential response option may be evaluated for cost. The system 100 may evaluate what happens if a potential response option turns out to be incorrect as well as what happens if aspects associated with the potential response option turn out to be incorrect. For example, if the system 100 gets a response correct but populates an incorrect field that is easily correctable by the user, the cost associated with selecting that response option and populating the field may be low.

In one example, costs associated with misclassification of intent may be learned through subjective measures. Examples of subjective measures include but are not limited to: data for idempotency versus non-idempotency, time sensitivity, historical usage patterns and user interactions, among other examples. In another example, costs associated with misclassification of intent may be learned based on empirical data collected (e.g., annotated sessions, randomized experimentation). In yet another example, the cost of misclassification of intent may be learned through both subjective measures and empirical data. The system 100 may maintain information associated with an evaluation of cost of misclassification in a component such as an action cost store 116. The information maintained by the action cost store 116 may include but is not limited to: policy and rules related to cost misclassification determination and modeling, collected or accumulated information such as information on subject measures and empirical data and any other data that may assist the user interaction mediation component 112 in evaluating a cost associated with aspects of a response option. The action cost store 116 is a framework representing information used by the user interaction mediation component 112 in making a decision as to how to response to a received input. In one example, the action cost 116 may be a hardware component that has the ability to store data and process data to manage requests for cost information. In another example, the action cost store 116 may be run as a software component executable on a processing device or across multiple processing devices.

The user interaction mediation component 112 may also evaluate the system's confidence in a response option (including parameters of the response option) at a point in time when the system 100 is determining options to pursue in response to a received input. An uncertainty metric or value may be determined based on a confidence values (scores) accumulated or aggregated from components of the input understanding platform 104 (e.g., input recognition component 106, input understanding component 10 and input context component 110). In that example, data such as knowledge data (e.g. data from the knowledge store 114) applied during processing of a received input may be factored into the uncertainty value as that is an aspect of evaluating context associated with an understanding of a received input. In another example, an uncertainty value (e.g. metric) may be determined based on a confidence values (scores) accumulated or aggregated from components of the input understanding platform 104 and supplemental information from other components of the system 100 or external to the system. As an example, an uncertainty value may correspond to a potential response option as a whole. However, aspects of each response option may be evaluated for certainty/uncertainty.

In one example, the user interaction mediation component 112 may evaluate cost of misclassification and uncertainty values individually, and determine a best possible response option based on evaluation of such aspects for each possible response option. In evaluating the cost of misclassification and the uncertainty of possible response options, the user interaction mediation component 112 may analyze discriminative classifiers for the generated cost of misclassification and the generated uncertainty value for each of the potential responses. In another example, the user interaction mediation component 112 may implement decision theory combining probability values associated with the generated cost of misclassification and the generated uncertainty value for each of the potential response options to determine a best possible response option. The user interaction mediation component 112 may be configured to enable implementation of any type of decision making model.

The user interaction mediation component 112 makes a determination as to whether to execute an action or seek clarification based on evaluating or analyzing both the cost of misclassification of intent and an uncertainty value with respect to potential response options. The system 100 via the user interaction mediation component 112 selects a response from the potential response options to transmit to the user based on evaluating the uncertainty value and the cost of misclassification for the potential response options. In a case where the user interaction mediation component 112 determines that further clarification or confirmation is required from a user, the user interaction mediation component 112 may determines modes of clarifying the received input. Modes of clarifying the received input may be ways that the system 100 can go about requesting clarification from the user. As an example, the system 100 may identify that further information may need to be acquired from the user in order to take a certain action such as sending an email. By evaluating the context of possible response options, the system 100 may identify what action to take and the parameters associated with the action that may still need clarification. Based on such information, the system 100 can evaluate how to structure a response to a user. Examples of modes of clarifying may include but are not limited to: confirmation of information, requesting the user to provide additional information and suggesting alternative options to the user (e.g., one or more response options), among other examples. Similar to evaluating cost associated with misclassifying a response option, the system 100 may evaluate cost for modes of clarification. The system 100 may select a mode of clarifying the received input based on evaluation of a generated cost value for determined modes of clarifying identified by the system 100.

In one example, the system may determine that sending an email message is the best response option by evaluating all possible response options. By evaluating the context of that response option based on the received input, the system 100 may determine that certain information such as an email address of a recipient and content to include in the email is still needed for in order to send an email. The system 100 may also identify that other optional fields of information are incomplete but not required for sending of the email. The system 100 has the option of sending clarification to the user requesting that they provide information (at least the necessary information and possibly the optional information) in order to be able to send the email. However, the system 100 may also take into account that asking the user for too much information may frustrate the user. Thus, the system may be selective in how a response is structured to the user. That is, the system 100 may elect a mode of clarifying such as requesting the user to provide additional information, but selectively determine what information to ask for, when to ask, and keep track of how many times the system 100 is interacting with the user. For example, the system 100 may intelligently evaluate the flow/state of an interaction with the user (e.g. conversation) at the point of seeking clarification/confirmation from the user. In an example where the system 100 has queried the user multiple times seeking clarification, the system 100 might intelligently manage its interactions with the user. The system 100 may also evaluate cost associated with clarifying parameters or aspects associated with a selected response option. Once a response option is selected, the user interaction mediation component 112 may transmit the response option to the user interaction component 102 to be presented to a user.

FIG. 2 illustrates an example method 200 of input processing by an input understanding platform. As an example, method 200 may be executed by a system such as the system 100 of FIG. 1. Method 200 may be operations executed by an input understanding platform such as the input understanding platform 104 of FIG. 1. However, method 200 is not limited to such examples. Method 200 may be performed by one or more processing devices. In other examples, method 200 may be performed by an input understanding service or application.

Method 200 begins at operation 202 where input is processed by an input recognition component. An input recognition component receives processes and translates a received input for recognition. An exemplary input recognition component is the input recognition component 106 of FIG. 1. When an input is received, it is processed for recognition. An input recognition component may include components or resources that are able to receive and process a received input. In other examples, an input recognition component may interface with external components or resources to process a received input. As an example shown in FIG. 2, the input recognition component may make a determination that a received input is "Send Message to Omar". A determination made by the input recognition component includes determining a level of certainty for the received input. Aspects of the input evaluated by the input recognition component to determine a level of certainty with respect to recognition of the received input are detailed in the description of FIG. 1. In the example shown in FIG. 2, a determined level of certainty for an input of "Send Message to Omar" is one-hundred percent (100%) indicating that the input recognition component is very certain that it is interpreting the received input correctly. In another example, operation 202 yields results where a system or service is not 100% sure of an output and may produce multiple possibilities. For instance, alternative outputs may be "Send message to Osman" or it may be "Find message from Omar." As processing for method 200 proceeds, the multiple possibilities produced in operation 202 may cascade into even more options as processing continues (e.g., in operations 204, 206, 208 and 210).

Method 200 proceeds to operation 204, where the received input is analyzed by an input understanding component. The input understanding component determines interpretations or understandings for the analyzed input based on a recognition by the input recognition component. An exemplary input understanding component is the input understanding component 108 described in FIG. 1. An input understanding component may include components or resources that are able to analyze the received input. In other examples, an input understanding component may interface with external components or resources to process a received input (e.g., knowledge store 114 of FIG. 1). Continuing the example where the recognized input is "Send Message to Omar," example interpretations/understandings of that recognized input may "Send Text Message to Omar" and "Send Email Message to Omar" among other examples. A determination made by the input understanding component includes determining a level of certainty for the determinations by the input understanding component. Aspects of the input evaluated by the input understanding component to determine a level of certainty with respect to developing understandings of the received input are detailed in the description of FIG. 1. In the example shown in FIG. 2, a determined level of certainty for an understanding of "Send Text Message to Omar" is fifty percent (50%) and a determined level of certainty for an understanding of "Send Email Message to Omar" is fifty percent (50%) indicating that competing alternatives have been identified by the input understanding component. At this point in evaluating the received input, there is a level of uncertainty with respect to intent of the user as an input of "Send Message to Omar" is a broad statement that is able to be interpreted in different ways by the input understanding component.

Flow may proceed to operation 206 where a context of the input is evaluated by an input context component. An input context component evaluates context of the analyzed input including determining possible responses for the analyzed input and strategy for responding to a user. An exemplary input understanding component is the input context component 110 described in FIG. 1. An input context component may include components or resources that are able to receive and evaluate context for an input. In other examples, an input context component may interface with external components or resources to evaluate context for an input. An input context component builds off the determined understandings identified by an input understanding component to determine possible response options. The input context component evaluates a meaning and provides context to the understanding determined by the input understanding component. Continuing the example where determined understandings include "Send Text Message to Omar" and "Send Email Message to Omar", examples of possible response options determined by the input context component include: "Draft Text Message to Omar", "Send Text Message to Omar", "Draft Email Message to Personal Email Address for Omar", "Send Message to Personal Email Address of Omar", "Draft Email Message to Business Email Address for Omar", and "Send Email Message to Business Address for Omar" among other examples. Aspects of the input evaluated by the input context component are detailed in the description of FIG. 1. As an example, in evaluating context of an understanding of the receive input, the input context component may evaluate who "Omar" is. For instance, is "Omar" a name in a listing of Contacts, are there multiple listings for "Omar" identified, is "Omar" a name that is linked to information identifiable by searching resources such as the Internet, etc. A determination made by the input context component includes determining a level of certainty for the possible response options. In the example shown in FIG. 2, a determined level of certainty is shown for each of the possible response options. Aspects of the possible response options evaluated by the input context component to determine a level of certainty are detailed in the description of FIG. 1.

If an input understanding platform determines that it is certain that a response option is better than other alternatives, and the system has information needed to appropriately take action based on the received input, the input understanding platform executes an action based on the received input. Using the example where a received input is "Send a Message to Omar", the input understanding platform may generate a draft of a text message to a contact named "Omar". The input understanding platform may use the determined level of certainty with respect to possible response options to evaluate whether a response option is a better choice than other response options. If uncertainty exists (e.g., based on competing alternative options or identification of a type of uncertainty with respect to a possible response option), flow proceeds to operation 208 where potential response options are further evaluated by a user interaction mediation component. The user interaction mediation component evaluates potential response options for a received input when the input understanding platform is uncertain of a response option and/or information associated with a possible response option. Information associated with a possible response option may be aspects or parameters that the system identifies as needed to take action on behalf of a user with respect to a received input.

The user interaction mediation component further evaluates potential response options based on aspects such as a cost of misclassification of intent, and an uncertainty value (e.g. aggregate uncertainty value) associated with a response option (including parameters of the response option) at a given point in time. Detailed description of a cost of misclassification and an uncertainty value are provided in the description of FIG. 1. As an example, an evaluation of a potential response option of "Draft Text Message to Omar" may determine that an aggregate level of uncertainty is low, meaning that the system identifies a strong correlation between an intent of the received input "Send Message to Omar" and a possible response option of "Draft Text Message to Omar". As shown in FIG. 2, a cost of misclassification for "Draft Text Message to Omar" is low, meaning that the input understanding platform identifies after evaluation that a risk of drafting a text message to a contact named Omar and being incorrect is low. Considering another potential response option, "Send Text Message to Omar", the aggregate uncertainty value determined may be "high", meaning that the input understanding platform is uncertain of whether the user intends to send a text message to a contact named Omar as well as what information to include in the text message to Omar. Further, the cost of misclassification associated with a response option of "Send Text Message to Omar" may be high, meaning that the system identifies that if the user did not intend to send a text message to Omar (or sent a text message with incorrect information) the consequence would be high. (e.g., action may likely frustrate and alienate a user).

Once possible response options that the input understanding platform is unsure about are evaluated, flow proceeds to operation 210 where a response option is selected to send to a user. As an example, the user interaction mediation component may select the best possible response option based on evaluation of the aggregate uncertainty value and the cost of misclassification associated with a possible response option. For example, if "Draft Text Message to Omar in Contacts" is the determined response option, the user interaction mediation component may have identified that it is uncertain with what content to include in the drafted text message to Omar. As an example, the input understanding platform may proceed with drafting a text message to Omar but may further determine whether to obtain clarification on the content to be included in the drafted text message. Alternatively, a user interaction mediation component may determine that a best response option would be to seek clarification from the user before taking further action with respect to drafting or sending a text message to Omar. Aspects related to determining modes of clarification and how to select a mode of clarifying a received input are detailed in the description of FIG. 1. The input understanding platform may make a determination as to how to respond and if clarification is needed, what is the best way to seek clarification from a user. In addition to response options of 1) executing an action without clarification and 2) seeking clarification from the user, another example option is to seek implicit confirmation, where an input understanding system or service presents what it heard while asking for new information. For example, a user may enter an input of "set up a meeting John." The input understanding system or service processes this input and returns a response of "when do you want to set up the meeting with John?" As a note, the an input understanding system or service may not be sure whether it heard e.g. John or Johnny, but reading/displaying that out to the user while asking for new information is a form of implicit confirmation that the user intended to setup a meeting with "John." Based on the response, the user may make a response of "three PM." In this manner, a user has implicitly confirmed that the input understanding system or service has accurately evaluated a user input.

FIG. 3 illustrates an example method 300 for input processing of multiple inputs. As an example, method 300 may be executed by a system such as the system 100 of FIG. 1 or any system comprising at least one processing device. Method 300 may be operations executed by an input understanding platform such as the input understanding platform 104 of FIG. 1. However, method 300 is not limited to such examples. Method 300 may be performed by one or more processing devices. In other examples, method 300 may be performed by an input understanding service or application. Method 300 demonstrates that processing can be continuously based on interaction(s) with a user and that processing may aggregate or build off of previous interactions with a user.

Flow begins at operation 302, where a first input is received. Input may be received at a component of a system such as the system 100 in FIG. 1 or any processing component or device capable of receiving input. Once input is received, the received input is analyzed (operation 304). As an example, analyzing the input may include processing performed by one or more components described in FIGS. 1 and 2 (e.g., input recognition component, input understanding component, input context component, and user interaction mediation component).

In analyzing the input received, a determination (decision operation 306) may be made to whether a system or service is uncertain with respect to a potential response option. If the system or service is certain with respect to a response option and/or information/parameters associated with the response option, then flow proceeds to operation 308 where a response is sent back to the user. A response option may be selected by comparing possible response options evaluated by the system or service in response to a received input and selecting a highest rated/ranked response option based on evaluation. The response may include execution of a task or action on behalf of the user based on an input of the user. If flow reaches operation 308, method 300 ends and a system or service may wait to receive further input from a user. If further input is received (at any time after the first input), the system or service will begin flow at operation 304 where received input is analyzed. In analyzing input received, the system or service may check whether the input is associated with a previous input submitted by a user. The system or service may use knowledge data (such as data stored in knowledge store 114 of FIG. 1) to intelligently build a context for an input if it is determined that the input is linked to a previous input.

However, if it is determined that a level of uncertainty exists with respect to a response option and/or information associated with a potential response option, flow may proceed to operation 310 where potential response options are evaluated. Evaluation of potential response options includes evaluating aspects of each response option including an uncertainty value and a cost of misclassification, as described previously in FIGS. 1 and 2. In evaluating potential response options for a received input, the system or service makes a decision (decision operation 312) as to whether it believes that further clarification is needed. If it is determined that further clarification is not necessary, flow proceeds to operation 318 where a response option is selected and a response to the received input is sent to a user. At that point flow proceeds when further input is received (operation 320) from a user.

However, if the system identifies that further clarification is needed at operation 312, flow proceeds to operation 314 where modes of clarification are evaluated. Evaluation of modes of clarification is detailed in the description of FIG. 1. Based on evaluating modes of clarification, the system or service selects and sends (operation 316) a response to a user including a mode of clarification. At that point flow proceeds when further input is received (operation 320) from a user. If further input is received (at any time after the first input), flow is directed to operation 304 where received input is analyzed. In analyzing input received, the system or service may check whether the input is associated with a previous input submitted by a user. Knowledge data (such as data stored in knowledge store 114 of FIG. 1) may be used to intelligently build a context for an input if it is determined that the input is linked to a previous input. The system or service may continuously aggregate data from previous inputs to improve processing of user inputs. Method 300 may continue for a plurality of inputs as long as a user is providing input requiring analysis.

FIG. 4A illustrates an example method 400 of responding to a received input. Method 400 may be executed by a system such as the system 100 of FIG. 1 or any input system understanding comprising at least one processing device. Method 400 may be operations executed by an input understanding platform such as the input understanding platform 104 of FIG. 1. However, method 400 is not limited to such examples. Method 400 may be performed by one or more processing devices. In other examples, method 400 may be performed by an input understanding service or application.

Flow begins at operation 402 where a received input is analyzed. Analyzing the received input may include processing performed by one or more components described in FIGS. 1 and 2 (e.g., input recognition component, input understanding component, input context component, and user interaction mediation component). In analyzing the input received, response options may be determined for responding to a received input. Analyzing the received input includes evaluating the response options and determining whether uncertainty exists with respect to potential response options. In one example, response options may be ranked based on a determined likelihood that the response option satisfies an intention of a received input. However, a component may analyze and evaluate response options in any manner that enables the component to distinguish response options from one another. Evaluating of response options further includes evaluating aspects of a potential response option. For instance, in evaluating a response option, a component may determine both information that has already been identified from analyzing a received input and information that may still be required for the component to execute a task or action based on the received input. This may enable determination as to whether there is uncertainty with respect to potential response options. If a component is certain of a response option to select (including parameters associated with the selected response option), the component may send a response to a user.

If a component is uncertain with respect to selection of a potential response option, flow may proceed to operation 404, where a cost of misclassification and an uncertainty value are generated for potential response options. Determination of the cost of misclassification and an uncertainty value for potential response options are detailed in the description of at least FIGS. 1 and 2. The component may compare (operation 406) potential response options based on the generated the cost of misclassification and an uncertainty value for each of the potential response options. Comparison of the potential response options may include evaluating, for each of the potential response options, the cost of misclassification and an uncertainty value based on discriminative/conditional modeling or generative modeling.

Based on evaluation of the potential response options, a response option is selected (operation 408). Selection of a potential response option may include identifying whether further clarification is required. Once a response option is selected, the component may send (operation 410) the response to the user. If it is determined that further clarification is needed from the user, the response may include clarification or confirmation.

Figure 4B:
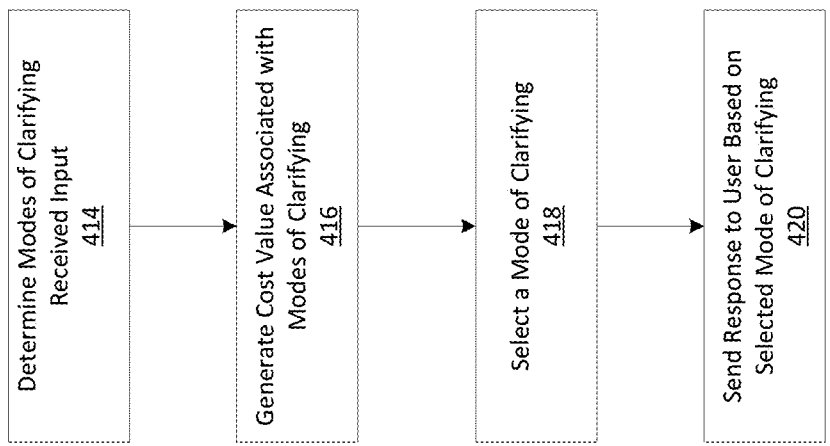
FIG. 4B illustrates an example method for response generation including clarification/confirmation.

FIG. 4B illustrates an example method 412 for responding to a received input via further clarification/confirmation. Method 412 may be executed by a system such as the system 100 of FIG. 1 or any system comprising at least one processing device. Method 412 may be operations executed by an input understanding platform such as the input understanding platform 104 of FIG. 1. However, method 412 is not limited to such examples. Method 412 may be performed by one or more processing devices. In other examples, method 412 may be performed by an input understanding service or application. As an example, method 412 may be executed when clarification or confirmation is needed based on an input received.

Flow begins at operation 414, where modes of clarifying received input are determined. Description for modes of clarification are provided as described above in FIG. 1. For each of the modes of clarification a cost value may be generated (operation 416). A cost of clarification is an evaluation of how requesting clarification from a user may affect a user. For example, if a system or service of a user input platform requests clarification from the user too often, this may negatively affect a user experience. In some instances, a user may grow frustrated with an input understanding system or service and stop using it. Evaluation of a cost associated with clarification/confirmation from a user may enable an input understanding system or service to intelligently manage requesting a user for more information by determining how and when to ask a user for clarification.

As an example, generation of a clarification cost value may be learned through subjective measures. Examples of subjective measures include but are not limited to: data for idempotency, time sensitivity, historical usage patterns, data pertaining to user interaction (including current user interaction) and counters, among other examples. In another example, costs may be learned based on empirical data (e.g., annotated sessions, randomized experimentation) or knowledge data collected and applied to make a determination as to when and how to seek clarification from a user. In yet another example, the cost of clarification may be learned through both subjective measures and empirical data. For instance, an input system or service may keep track of an interaction with a number of interactions with the user and partially base its cost estimation on the number of times the user has been asked to provide information. However, cost of clarification may be based on a combination of factors as determined by an input system or service.

The input system or service selects (operation 418) a mode of clarifying by evaluating the cost values of each mode of clarification. A response may be sent (operation 420) based on a selected mode of clarification. Flow may conclude when the response is sent (operation 420) to a user. However, an input understanding system or service may repeat a process of determining a mode of clarification any time an input is received where is determined that clarification may be required.

Figure 5:
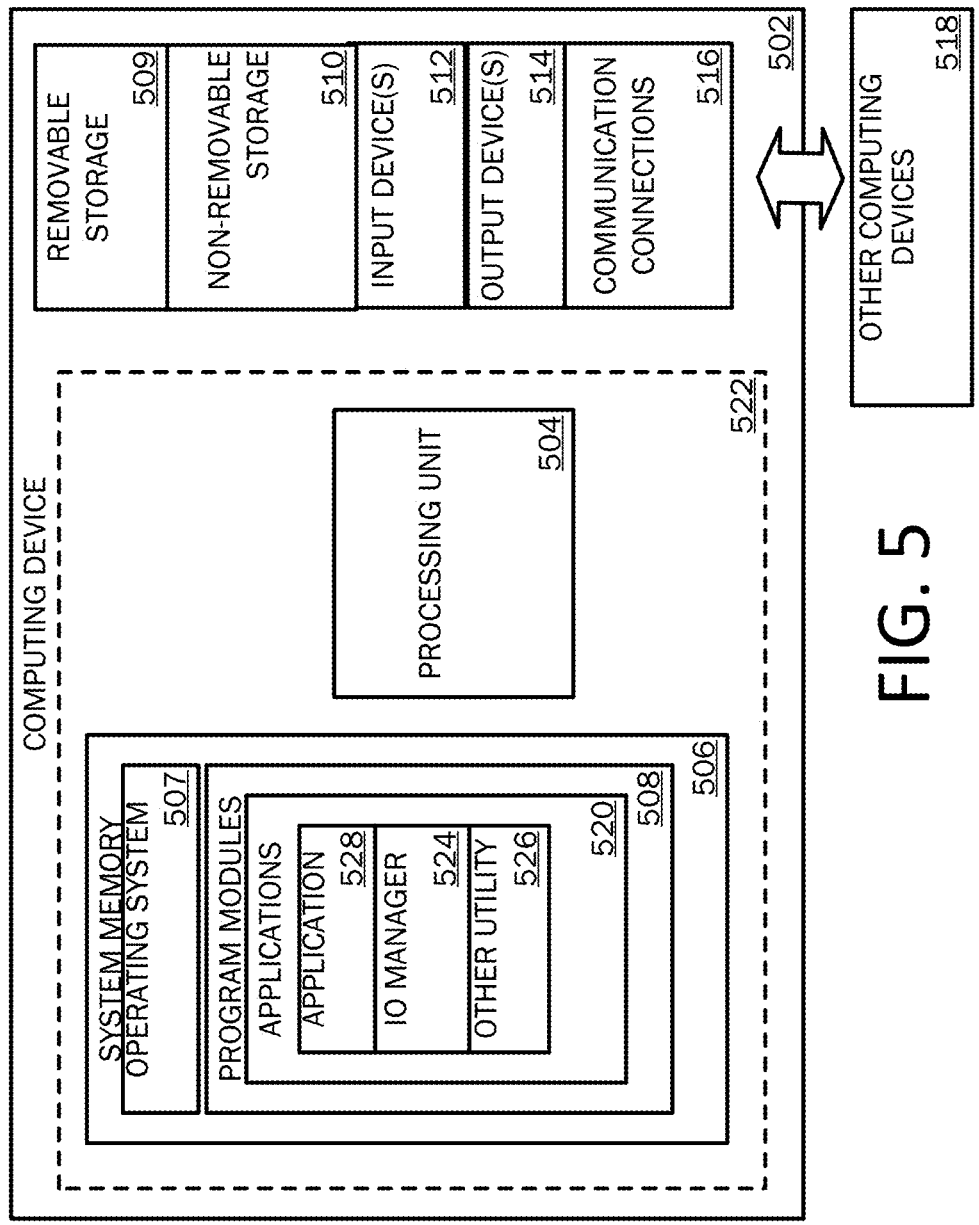
FIG. 5 is a block diagram illustrating an example of a computing device with which aspects of the present disclosure may be practiced.
Figure 6A:
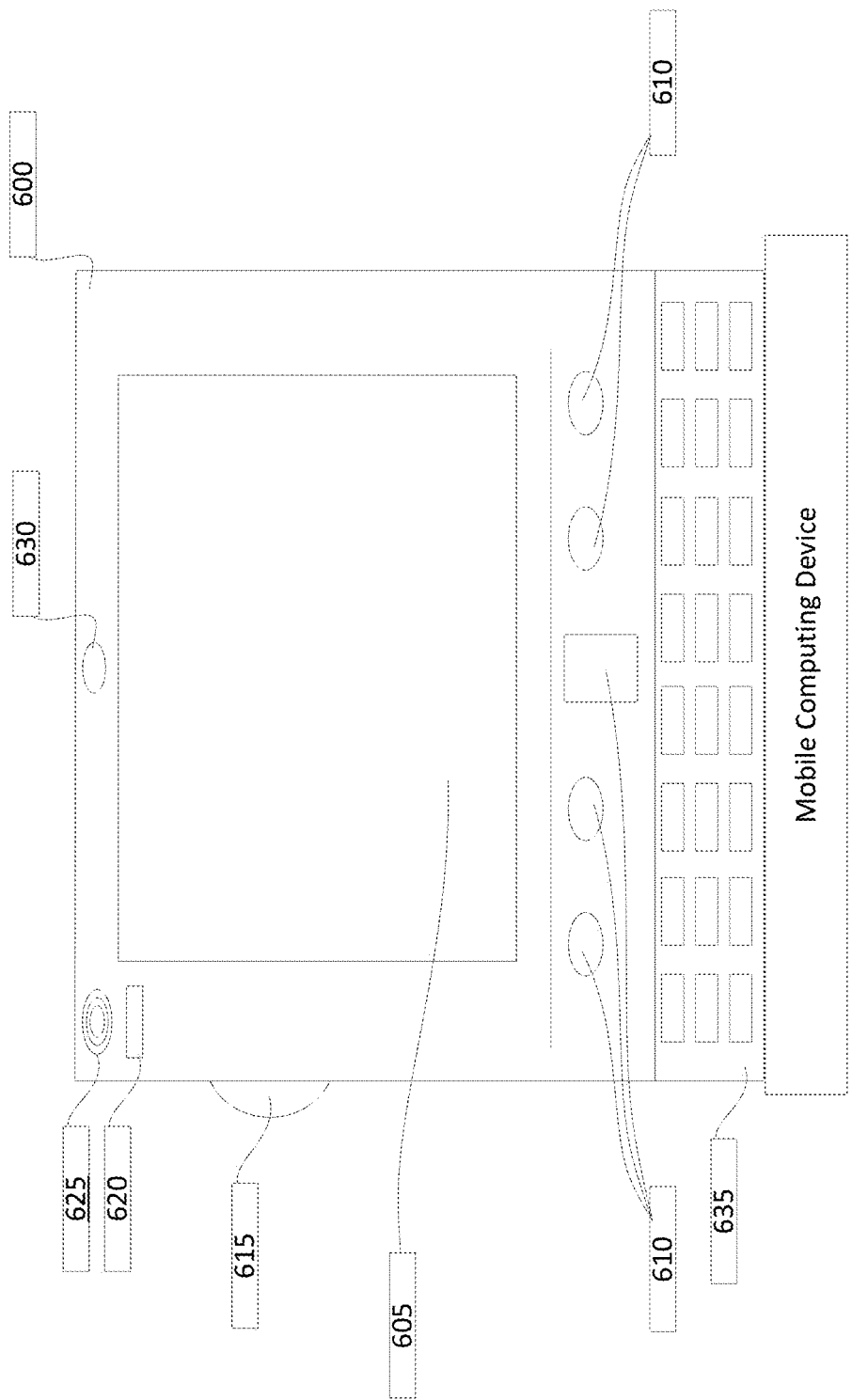
FIGS. 6A and 6B are simplified block diagrams of a mobile computing device with which aspects of the present disclosure may be practiced.
Figure 6B:
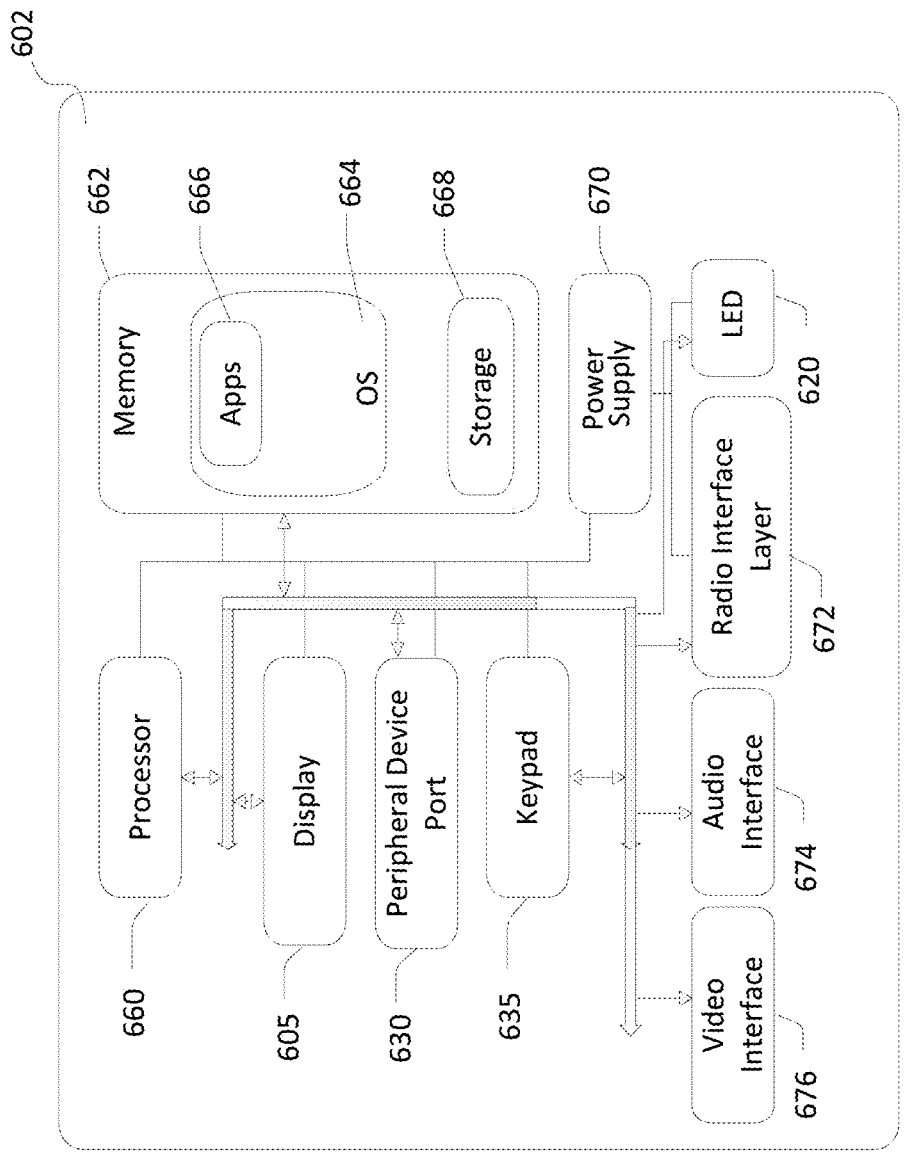
Figure 7:
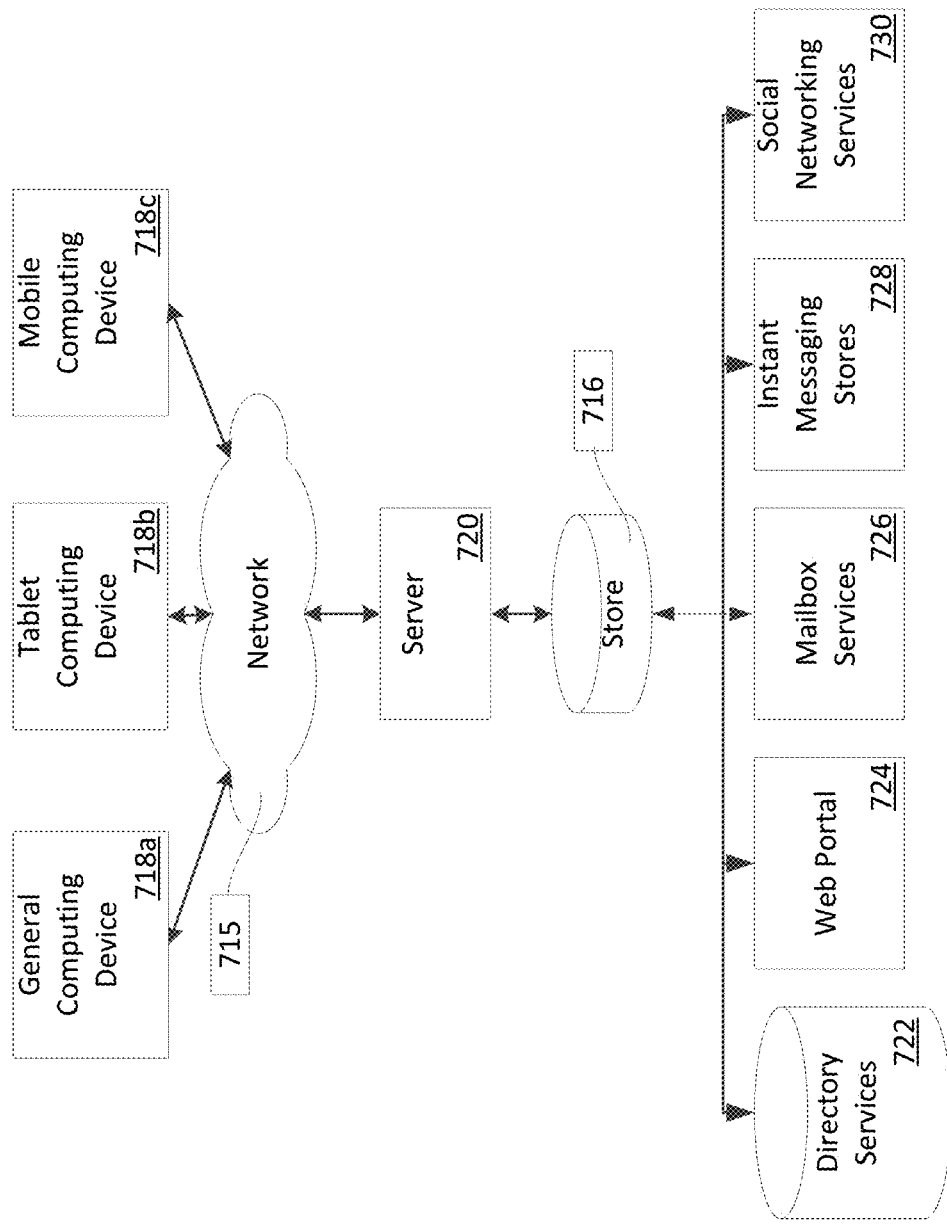
FIG. 7 is a simplified block diagram of a distributed computing system in which aspects of the present disclosure may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing examples of the invention, described herein.

FIG. 5 is a block diagram illustrating physical components of a computing device 502, for example a component of an input understanding system with which examples of the present disclosure may be practiced. The computing device components described below may be suitable for the computing devices described above. In a basic configuration, the computing device 502 may include at least one processing unit 504 and a system memory 506. Depending on the configuration and type of computing device, the system memory 506 may comprise, but is not limited to, volatile storage (e.g., random access memory), non-volatile storage (e.g., read-only memory), flash memory, or any combination of such memories. The system memory 506 may include an operating system 507 and one or more program modules 508 suitable for running software applications 520 such as application 528, 10 manager 524, and other utility 526. As examples, system memory 506 may store instructions for execution. Other examples of system memory 506 may components such as a knowledge resource. The operating system 507, for example, may be suitable for controlling the operation of the computing device 502. Furthermore, examples of the invention may be practiced in conjunction with a graphics library, other operating systems, or any other application program and is not limited to any particular application or system. This basic configuration is illustrated in FIG. 5 by those components within a dashed line 522. The computing device 502 may have additional features or functionality. For example, the computing device 502 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 506. While executing on the processing unit 504, the program modules 508 (e.g., application 528, Input/Output (I/O) manager 524, and other utility 526) may perform processes including, but not limited to, one or more of the operations described in FIGS. 2 through 4B, for example. Other program modules that may be used in accordance with examples of the present invention may include electronic mail and contacts applications, input understanding services (e.g., applications and/or programs) word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 502 may also have one or more input device(s) 512 such as a keyboard, a mouse, a pen, a sound input device, a device for voice input/recognition, a touch input device, etc. The output device(s) 514 such as a display, speakers, a printer, etc. may also be included. The aforementioned devices are examples and others may be used. The computing device 504 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 506, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 502. Any such computer storage media may be part of the computing device 502. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a personal data assistant, a tablet personal computer, a laptop computer, and the like, with which examples of the invention may be practiced. For example, mobile computing device 600 may be implemented as system 100, components of system 100 or may be configured to execute processing methods as described in FIGS. 2 through 4B, among other examples. With reference to FIG. 6A, one example of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one examples, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including application 528, IO manager 524, and other utility 526 described herein.

The system 602 has a power supply 670, which may be implemented as one or more batteries. The power supply 670 might further include an external power source, such as an AC adapter or a powered docking cradle that supplements or recharges the batteries.

The system 602 may include peripheral device port 678 that performs the function of facilitating connectivity between system 602 and one or more peripheral devices. Transmissions to and from the peripheral device port 672 are conducted under control of the operating system 664. In other words, communications received by the peripheral device port 678 may be disseminated to the application programs 666 via the operating system 664, and vice versa.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an application that reliably accesses target data on a storage system and handles communication failures to one or more client devices, as described above. Target data accessed, interacted with, or edited in association with application 528, IO manager 524, other utility 526, and storage may be stored in different communication channels or other storage types. For example, various documents may be stored using a directory service 722, a web portal 724, a mailbox service 726, an instant messaging store 728, or a social networking site 730, application 528, IO manager 524, other utility 526, and storage systems may use any of these types of systems or the like for enabling data utilization, as described herein. A server 720 may provide storage system for use by a client operating on general computing device 502 and mobile device(s) 600 through network 715. By way of example, network 715 may comprise the Internet or any other type of local or wide area network, and client nodes may be implemented as a computing device 502 embodied in a personal computer, a tablet computing device, and/or by a mobile computing device 600 (e.g., a smart phone). Any of these examples of the client computing device 502 or 600 may obtain content from the store 716.

A non-limiting example describes a system comprising a memory and at least one processor connected with the memory and configured to execute processing for components of an input understanding platform. The system comprises a user interaction mediation component to evaluate potential response options for an input when the system is uncertain of a response to the input. The user interaction mediation component evaluates the potential response options based on an uncertainty value associated with a potential response option and parameters of the potential response option, and a cost of misclassification of pursuing a potential response option if the potential response option turns out to be incorrect. A cost of misclassification is a cost value estimating an impact if a potential response option turns out to be incorrect and if the parameters associated with the potential response option turn out to be incorrect, and wherein the cost of misclassification determined based on at least one of subjective measures and empirical data. The user interaction mediation component selects a response from the potential response options to transmit to the user based on evaluating the uncertainty value and the cost of misclassification for the potential response options.

In other examples, the input understanding platform further comprises an input recognition component to receive, process and translate the input for recognition. The input recognition component further determines a confidence value associated with recognition of the input. The input understanding platform further comprises an input understanding component to analyze the input for understanding including determining alternative understandings of the analyzed input and determining a confidence value associated with the alternative understandings of the analyzed input as well as an input context component to evaluate context of the analyzed input including determining possible response options based on evaluation of the context of the analyzed input and determining a confidence value for each potential response option based on evaluation of the parameters of each potential response option. In one example, the user interaction mediation component aggregates confidence level values received from the input recognition component, the input understanding component and the input context component to determine the uncertainty value.

In examples, the user interaction mediation component determines modes of clarifying the received input if the selected response is a request for further clarification of the input based on a context of the selected, generates a cost value associated with each of the determined modes of clarifying, selects a mode of clarifying the input based on evaluation of the generated cost value for the determined modes of clarifying, and identifies parameters associated with the mode of clarifying for the user to respond to based on analyzing the input using knowledge information managed by the system. The user interaction mediation component further determines, for the response, whether to execute an action or request further clarification by one of: analyzing discriminative classifiers for the cost of misclassification and the uncertainty value for a potential response, and modeling probability data based on a combination of the cost of misclassification and the uncertainty value for a potential response.

As an example, the input received is a voice input received by the system, the input recognition component is a speech recognition component, the input understanding component is a spoken language understanding component, and the input context component is a dialog policy component.

Another non-limiting example describes a computer-implemented method comprising analyzing received input using an input recognition component, input understanding component and input context component, generating, for potential responses to the received input, an uncertainty value determined based on a potential response and parameters associated with the potential response and a cost of misclassification associated with pursuing a potential response if the potential response turns out to be incorrect, when uncertainty exists with respect to a response to the received input, and selecting a response to transmit to a user based on analyzing the generated cost of misclassification and the generated uncertainty value for the potential responses. The received input is at least one of a voice input, a gesture input, a text input and a handwritten input. The response is one of an action executed in response to the received input and a request for further clarification of the received input, and a response including implicit confirmation of a received input. Generating of the uncertainty value for a potential response is based on aggregating confidence values obtained during the analyzing of the received input from each of the input recognition component, the input understanding component and the input context component. Selecting of the response is determined based at least one of: analyzed discriminative classifiers for the generated cost of misclassification and the generated uncertainty value for each of the potential responses, and probability data combining the cost of misclassification and the uncertainty value for a potential response.

In examples, the computer-implemented method further comprising comparing potential responses by evaluating the generated cost of misclassification and the generated uncertainty value for each potential response, wherein the selecting selects the response based on the comparing.

In yet another example, the computer implemented method further comprises transmitting the response to the user, analyzing another received input from the user including applying knowledge data associated with a previously received input to the another received input, generating, for potential responses to the another received input, an uncertainty value determined based on a potential response to the another received input and parameters associated with the potential response and a cost of misclassification for a case where the potential response to the another received input turns out to be incorrect, when uncertainty exists with respect to a response to the another received input, and selecting another response to transmit to the user based on analyzing the generated cost of misclassification and the generated uncertainty value for the potential responses to the another received input.

In other examples, the computer-implemented method further comprises determining modes of clarifying the received input if the selected response is a request for further clarification of the received input, generating a cost value associated with each of the determined modes of clarifying, and selecting a mode of clarifying the received input to provide the user based on evaluation of the generated cost value for the determined modes of clarifying. Selecting of the mode of clarifying further comprises identifying parameters associated with the mode of clarifying for the user to respond to based on analyzing the received input using knowledge data stored in at least one knowledge store.

In another non-limiting example, a computer-readable storage device containing instructions is described. When the instructions of the computer-readable storage device are executed on at least one processor, the processor executes a process comprising: analyzing received input using an input understanding platform, wherein confidence values are determined upon components of the input understanding platform evaluating the received input, aggregating the determined confidence values components of the input understanding platform to determine a level of uncertainty with respect to a potential response to the received input, determining whether to request further clarification from a user based on evaluating the level of uncertainty for the potential response and a cost of misclassification associated with pursuing a potential response option if the potential response option turns out to be incorrect, and selecting a response to transmit to a user based on the determining. As an example, the determining executed by the processor determines whether to execute an action or request further clarification by at least one of analyzing discriminative classifiers for the cost of misclassification and the level of uncertainty for the potential response, and analyzing combined data based on the cost of misclassification and the level of uncertainty for the potential response. In another example, the selecting executed by the processor selects a response from a plurality of potential response options by comparing the level of uncertainty and the cost of misclassification for the potential responses options.

In another example, the process executed on the processor comprises determining modes of clarifying the received input if the selected response is a request for further clarification of the received input, generating a cost value associated with each of the determined modes of clarifying, and selecting a mode of clarifying the received input to provide the user based on evaluation of the generated cost value for each of the determined modes of clarifying. In an example, the selecting of the mode of clarifying further comprises identifying parameters associated with the mode of clarifying for the user to respond to based on analyzing the received input using stored knowledge data.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A system comprising:
   at least one processor; and
   a memory storing instructions that, when executed by the at least one processor, cause the system to perform a set of operations, the set of operations comprising:
   generating, based on a received input, one or more potential response options that are responsive to the received input;
   evaluating the one or more potential response options to determine whether to request clarification when the system is uncertain of a response to the received input, further comprising evaluating each potential response option based at least in part on:
      an uncertainty value associated with the potential response option and parameters of the potential response option; and
      a cost of misclassification of pursuing the potential response option in response to the received input if the potential response option is incorrect for the received input;
   based on determining to request clarification, determining a clarification mode for requesting clarification of the received input from a plurality of clarification modes;
   generating, based on the determined clarification mode, a request for clarification of the received input;
   causing the generated request for clarification to be transmitted in response to the received input;
   receiving a response to the request for clarification; and
   performing an action based on the received response.

2. The system according to claim 1, wherein the set of operations further comprises:
   processing the input to determine a confidence value associated with recognition of the input;
   analyzing the input to determine alternative understandings and a confidence value associated with the alternative understandings; and
   evaluating context of the analyzed input to generate the one or more possible response options based on the context of the analyzed input;

determining a confidence value for each potential response option based on evaluation of the parameters of each potential response option; and wherein the uncertainty value for each potential response option is determined based on at least one of the confidence value associated with the recognition of the input, the confidence value associated with the alternative understandings, and the confidence value for each potential response option.

3. The system according to claim 2, wherein the input is at least one of a voice input, a gesture input, a text input and a handwritten input received by the system.

4. The system according to claim 1, wherein determining the clarification mode comprises:

generating a cost value associated with each of the plurality of clarification modes;

selecting the clarification mode based on an evaluation of the generated cost value for the plurality of clarification modes; and identifying parameters associated with the clarification mode based on analyzing the input using knowledge information managed by the system.

5. The system according to claim 1, wherein performing the action based on the received response comprises:

determining to execute an action or request further clarification by one of:

analyzing discriminative classifiers for the cost of misclassification and the uncertainty value for a potential response, and modeling probability data based on a combination of the cost of misclassification and the uncertainty value for a potential response.

6. The system according to claim 1, wherein the cost of misclassification is a cost value estimating an impact if a potential response option turns out to be incorrect and if the parameters associated with the potential response option turn out to be incorrect, and wherein the cost of misclassification determined based on at least one of subjective measures and empirical data.

7. A computer-implemented method comprising:

analyzing received input using an input recognition component, input understanding component and input context component;

generating, for each potential response of a set of potential responses to the received input:

an uncertainty value determined based on the potential response and parameters associated with the potential response; and a cost of misclassification associated with pursuing the potential response in response to the received input if the potential response is incorrect for the received input;

evaluating the set of potential responses to determine whether to request clarification;

based on determining to request clarification, determining a clarification mode for requesting clarification of the received input from a plurality of clarification modes;

generating, based on the determined clarification mode, a request for clarification of the received input; and causing the generated request for clarification to be transmitted in response to the received input.

8. The computer-implemented method according to claim 7, further comprising:

receiving a user response to the request for clarification; and selecting a response to transmit based on the received user response, wherein the response is selected from the set of potential responses based on evaluating the generated cost of misclassification and the generated uncertainty value for each potential response.

9. The computer-implemented method according to claim 8, wherein selecting the response is determined based at least one of: analyzed discriminative classifiers for the generated cost of misclassification and the generated uncertainty value for each of the potential responses, and probability data combining the cost of misclassification and the uncertainty value for a potential response.

10. The computer-implemented method according to claim 8, wherein the selected response is one of an action executed in response to the received input, a request for further clarification of the received input, and a response including implicit confirmation of a received input.

11. The computer-implemented method according to claim 8, further comprising:

transmitting the response to the user;

analyzing another received input from the user including applying knowledge data associated with a previously received input to the another received input;

generating, for potential responses to the another received input, an uncertainty value determined based on a potential response to the another received input and parameters associated with the potential response and a cost of misclassification for a case where the potential response to the another received input turns out to be incorrect, when uncertainty exists with respect to a response to the another received input; and selecting another response to transmit to the user based on analyzing the generated cost of misclassification and the generated uncertainty value for the potential responses to the another received input.

12. The computer-implemented method according to claim 7, wherein the generating of the uncertainty value for a potential response is based on aggregating confidence values obtained during the analyzing of the received input from each of the input recognition component, the input understanding component and the input context component.

13. The computer-implemented method according to claim 7, wherein determining the clarification mode comprises:

generating a cost value associated with each of the plurality of clarification modes; and selecting the clarification mode based on evaluation of the generated cost value for the plurality of clarification modes.

14. The computer-implemented method according to claim 13, wherein selecting the clarification mode further comprises identifying parameters associated with the clarification mode based on analyzing the received input using knowledge data stored in at least one knowledge store.

15. The computer-implemented method according to claim 7, wherein the received input is at least one of a voice input, a gesture input, a text input and a handwritten input.

16. A computer storage media containing instructions, that when executed on at least one processor, causing the processor to execute a process comprising:

analyzing received input using an input understanding platform, wherein confidence values are determined upon components of the input understanding platform evaluating the received input;

aggregating the determined confidence values components of the input understanding platform to determine a level of uncertainty with respect to a potential response to the received input;

determining whether to request further clarification from a user based on evaluating the level of uncertainty for the potential response and a cost of misclassification associated with pursuing a potential response option if the potential response option turns out to be incorrect;

based on determining to request further clarification, determining a clarification mode for requesting clarification of the received input from a plurality of clarification modes;

generating, based on the determined clarification mode, a request for clarification of the received input; and causing the generated request for clarification to be transmitted in response to the received input.

17. The computer storage media according to claim 16, wherein determining the clarification mode comprises:

generating a cost value associated with each of the plurality of clarification modes; and selecting the clarification mode based on evaluation of the generated cost value for each of the plurality of clarification modes.

18. The computer storage media according to claim 17, wherein selecting the clarification mode further comprises identifying parameters associated with the clarification mode based on analyzing the received input using stored knowledge data.

19. The computer storage media according to claim 16, wherein determining whether to request further clarification comprises at least one of:

analyzing discriminative classifiers for the cost of misclassification and the level of uncertainty for the potential response; and analyzing combined data based on the cost of misclassification and the level of uncertainty for the potential response.

20. The computer storage media according to claim 16, wherein the process further comprises:

receiving a user response to the request for clarification; and selecting a response from a plurality of potential response options by comparing the level of uncertainty and the cost of misclassification for the potential responses options.

* * * * *